Patented Mar. 6, 1923.

1,447,547

UNITED STATES PATENT OFFICE.

THADDEUS A. HACKLEY, OF SEATTLE, WASHINGTON.

TIRE TREAD.

Application filed October 1, 1921. Serial No. 504,624.

*To all whom it may concern:*

Be it known that I, THADDEUS A. HACKLEY, a citizen of the United States, and a resident of the city of Seattle, county of King, State of Washington, have invented certain new and useful Improvements in Tire Treads, of which the following is a specification.

This invention relates to improvements in treads for vehicle wheels; more particularly, it relates to fabric casings, or treads, adapted to be removably applied to the wheels of automobiles or other motor driven vehicles which employ pneumatic tires.

The principal object of the invention is to provide a removable fabric tread for increasing the life and durability of the tire, and which consists of a plurality of superimposed layers of fabric stitched and cemented together and equipped with transverse ridges whereby skidding is prevented.

Other objects of the invention reside in the specific construction of the tread which permits it to be applied to and removed from the tire, and in the means whereby it is held functionally in position.

In accomplishing these and other objects of the invention, I have provided the improved details of construction, the preferred forms of which are illustrated in the accompanying drawings, wherein—

Figure 1 is a side elevation of a portion of a vehicle wheel having a pneumatic tire equipped with a removable tread embodied by the present invention; the view illustrating the outside face of the tread.

Figure 2 is a similar view illustrating the inside face of the tread.

Figure 3 is a perspective view of a wheel equipped with a tread embodied by the present invention, showing the tread in the course of being removed from or applied to the tire.

Figure 4 is an enlarged, transverse section through a tire having a tread applied thereto according to the present invention.

Referring more in detail to the several views of the drawings, where in like reference characters designate the same or similar parts—

1 designates an automobile wheel which may be of the usual type of construction and equipped with a pneumatic tire 2 that is enclosed by a tread 3 that is constructed and applied to the wheel in accordance with the present invention. In its preferred form of construction, the tread is so made up that it will fit about the outer or natural tread portion of the tire. In most cases, it consists of four thicknesses of material, preferably heavy canvas, which are so disposed that the seams, or joints, formed where they come together will be offset from each other.

Referring particularly to Figure 4, which best illustrates the construction of the tread, it will be seen that the strips, or plies, of canvas are looped along their circumferential edges, forming on the outside face of the tread a continuous channel 5 wherein a band of wire or the like 6 is extended and which holds the outer portion of the tread in proper position.

In order that the tread may be readily applied to and removed from the tire, the inside wall of the same is provided at intervals with radially directed slits 8, thus forming flaps 9 which may be folded back as shown in the lower part of Figure 3, so that the tread may be slipped onto or from the tire. These flap portions are also provided, at their edges, with a hem, forming loops, or channels, 10 for receiving a band 11 whereby they are drawn down and the casing held thereby in position. Any suitable means, or method, may be employed to secure the ends of the bands together. Since it is not necessary that the outer wire be removed, it may be a continuous band. When the tread is in functional position, the flap 9 on the inner face may be disposed in overlapped relation, as is shown in Figure 2. While it is not necessary that the side provided with the flaps be the inner side of the casing, it is preferred that it be disposed in this manner, in order that the appearance of the tread will be enhanced.

At certain intervals about the tread, I have provided transversely directed ridges 12 which serve as anti-skid means. These ridges are formed by inserting between the plies of the casing a roll of fabric 14, as is indicated in Figure 2.

Assuming that the device is so constructed, it is apparent that it may be easily applied to or removed from a tire, and that by cementing the canvas layers together, it will be made very strong and durable.

It is also apparent that treads of this

Mar. 6, 1923.
H. G. HARLEY
1,447,548
CYLINDER COOLING SYSTEM OF INTERNAL COMBUSTION ENGINES
Filed Sept. 21, 1922
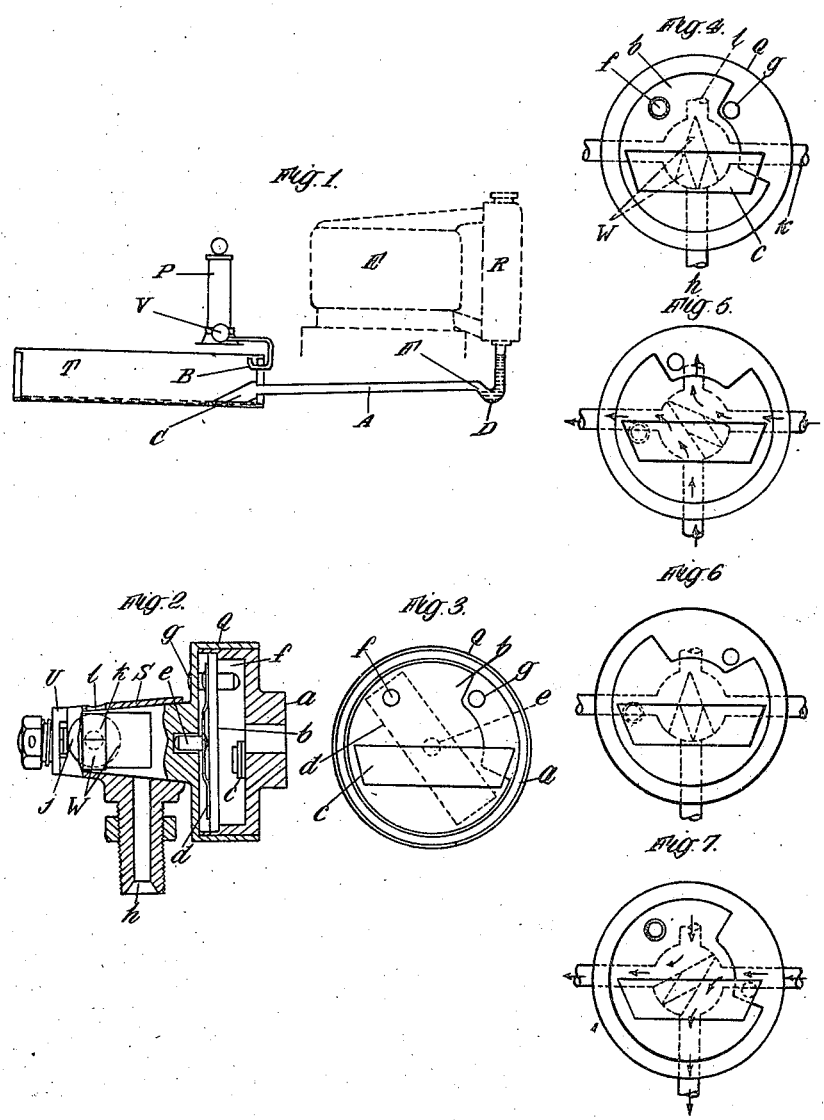
INVENTOR
Henry G. Harley
By Chas. J. Neill
Atty.

Patented Mar. 6, 1923.

1,447,548

UNITED STATES PATENT OFFICE.

HENRY GEORGE HARLEY, OF CAMBERLEY, ENGLAND.

CYLINDER-COOLING SYSTEM OF INTERNAL-COMBUSTION ENGINES.

Application filed September 21, 1922. Serial No. 589,646.

*To all whom it may concern:*

Be it known that I, HENRY GEORGE HARLEY, a subject of the King of Great Britain, residing at Kirkwall, Grand Avenue, Camberley, in the county of Surrey, England, have invented certain new and useful Improvements in or Relating to the Cylinder-Cooling Systems of Internal-Combustion Engines, of which the following is a specification.

This invention relates to the cylinder cooling systems of internal combustion engines.

During periods of engine inactivity in cold and frosty weather, damage and various inconveniences are liable to occur in connection with the water cooling systems of the engines of automobiles, air craft and the like, owing to the temperature reducing effects of cold upon the water, unless precautions are taken to prevent or minimize these effects. The troubles usually encountered are freezing of the water in parts of the cooling system, such as the radiator, with consequent damage, difficulty in starting the engine owing to congealing of the lubricating oil and in some cases owing to inefficient vaporization of liquid fuel, and also unsatisfactory running of the engine immediately after starting, partly owing to the above causes of bad starting, and also owing to the effects of cool cylinders upon the thermal efficiency or action of the engine.

The present invention has for its objects the provision of means for eliminating or substantially reducing the troubles above mentioned, which means shall make unnecessary the precautions that have been necessary heretofore, be convenient, practical and reliable in use and be capable of being connected to the engine water circulating system so as to be always ready for immediate use.

According to the present invention I connect with the ordinary water cooling system of an internal combustion engine a complete and self-contained apparatus which is substantially independent of the said engine or ordinary cooling system or any part or unit thereof and which comprises essentially a combination of a vessel or tank, capable of containing the engine cooling water and so constructed that it is a slow conductor of heat from its contents to the outer air, a pump of any convenient or suitable form which may be operated by hand or foot or by electric motor or the like so as to cause the water to flow from the engine circulating system into or out of the vessel already mentioned, at will, or in one direction only when gravity is used to cause a flow in the opposite direction—a suitable control valve or similar mechanism and any taps or the like which may be necessary in any particular case. In cases where it is desirable and where electric ignition is used, an automatic electric switch may be combined with the control mechanism for the purpose of preventing or reducing the risk of starting the engine without water, by causing a suitable interruption of the ignition current.

In order that the said invention may be clearly understood and readily carried into effect, the same will now be described more fully with reference to the accompanying drawings, in which:

Figure 1 is a purely diagrammatic illustration of an embodiment of the invention coupled up to the ordinary cylinder cooling system of an automobile.

Figure 2 is a part sectional view of a convenient and suitable control valve complete with switch.

Figure 3 is a diagrammatic front view of the said control valve.

Figures 4 to 7 inclusive indicate diagrammatically the several operative positions of the control valve shown in Figure 3.

Referring to Figure 1, as the engine E and radiator R do not constitute novel features of this invention, E and R are indicated by dotted lines while the essential novel features of the adaptation are indicated diagrammatically by full lines. In this figure the switch and its connections are omitted for clearness.

In use, after the engine has stopped running and while the water is still heated, the water is transferred from engine E and radiator R through pipe A to tank T and is retained therein. The water, being thus protected by the heat-retaining tank, is prevented from freezing and kept heated for a substantial and useful period of time even under severely cold conditions, while after a lengthy period of engine inactivity the water is returned in a heated condition to the engine prior to re-starting the latter, starting and running of the engine being greatly facilitated by the presence of the heated water.

In the foregoing operations the pump P with its control valve V has been used for the purpose of transferring the water in one or both directions, according to whether gravity is or is not utilized, the transference being caused by the pumping of air into, or out of the tank T according to the direction in which such transference is required.

In cases where gravity is not used, the control V is adapted so as to allow pressure to, or suction from the tank T at will, while in cases where gravity is used for causing transference in one direction, the control valve is adapted so as to allow either pressure to the tank only or suction from the tank only, while providing a suitable air vent in the system for the purpose of preventing "air locks" due to atmospheric pressure. For the same purpose, careful consideration requires to be given to all bends in water pipes and to disposal of the various parts, in all cases. In an adaptation substantially as described with reference to Figure 1, it is preferable that the greater portion of the pipe A should be free of water while the engine is running, so as to obviate risk of freezing in the pipe.

A convenient and suitable arrangement of the pipe (for cases wherein a suction and force pump acts upon air to displace the water, in the manner to be described later herein) is shown in Figure 1. The air union extension B reaches nearly to the top of the tank, thus providing for a high water level in the tank. The water union extension C reaches nearly to the bottom of the tank and if desired may dip into a sump or trough, in order to ensure expulsion of all but a small proportion of the water.

By arranging a bend in the pipe as shown at D, the completion of the operation of pumping air into the tank will cause air to enter pipe A and force the water in the said pipe down to the level indicated at F, any superfluous pumping causing the superfluous air to escape in bubbles through the radiator. Superfluous pumping in the reverse direction merely causes air to enter the tank through the radiator and pipe A, this air bubbling through the water in the tank and escaping through the pump.

A great advantage of the invention is that its various essential parts may be constructed according to known or obvious principles, with varying degrees of efficiency and cost of manufacture, giving a wide range of adaptability. Therefore, in those cases where a relatively less efficient form of construction is fairly satisfactory and relatively cheaper to produce, such form of construction may be employed in preference to other possible adaptation of the invention, although an arrangement of relatively high efficiency may be provided where necessary and where cost permits.

The vessel or tank may be of any convenient construction which allows it to perform the functions above described. For example it may embody the known principle of the vacuum vessel, according to which principle a double vessel has the air exhausted from a space between the inner and outer walls with the result that the vessel has low heat conductivity, such conductivity being still further reduced, if desired, by the provision of polished surfaces adjacent the vacuum, or the vessel may be a single vessel provided with a covering or lining of a material of low heat conductivity, or a double vessel having a layer of material of low heat conductivity between the double walls, or a vessel constructed of a material of low heat conductivity, or any combination of the several forms of construction above enumerated. Thus the tank may embody any known or obvious and convenient means for preventing too rapid heat loss from hot bodies. An enclosed air space between the double walls of a metal tank gives a substantial reduction of heat loss and is, therefore, sufficiently efficient in many circumstances. Such a tank is conveniently constructed with supports between the tank walls so arranged as to divide the air space, further suitable divisions being provided if necessary, such division of the air space being beneficial in cases where circulation of the air would otherwise impair tank efficiency to an appreciable extent. In all cases, any supports or other connections between the walls of double tanks or vessels should be of a material of low heat conductivity if possible, and designed to offer the maximum resistance to heat flow; for example those portions of the water and air connections that pass through the space between double walls, or through lagging, are preferably made as thin as possible.

In vacuum vessels, as is well known, it is necessary to provide strength to resist unbalanced atmospheric pressure and to allow for expansion of inner vessel. In the case of large vacuum tanks, special attention must be given to the means of supporting the inner tank.

The tank may be of any suitable shape, a round section being often suitable for commercial motor vehicles. A long tank of rectangular section and of light weight may conveniently be affixed to ordinary automobiles beneath the running board; a "three point" suspension may be provided for the tanks where necessary to eliminate risk or distortion.

The pump may be of any suitable form and operated in any convenient manner and may effect its purposes by operating upon the water or by operating upon air, the latter being drawn from, or forced into the tank to displace the water. In the case of ordinary automobiles the pump may be adapted to be fixed standing upon the running board.

The control valve shown in Figure 2 is suited for use on a pump which is arranged